United States Patent [19]
Baer et al.

[11] 4,220,533
[45] Sep. 2, 1980

[54] LIQUID-SEPARATING DEVICE

[75] Inventors: Harold J. Baer, 3022 Hall SE., Grand Rapids, Mich. 49506; Glenn B. Morse, Grand Rapids, Mich.

[73] Assignees: Harold J. Baer, Grand Rapids, Mich.; Harold J. Baer, Jr., Denver, Colo.; Lawrence J. Baer, Crotton, Md.

[21] Appl. No.: 551,161

[22] Filed: Feb. 20, 1975

[51] Int. Cl.² .................. B01D 35/06; E02B 15/04
[52] U.S. Cl. .......................... 210/223; 210/242 S; 210/DIG. 26
[58] Field of Search .............. 74/210; 210/40, 223, 210/242 OS, DIG. 21 M, 242 S, DIG. 26

[56] References Cited

U.S. PATENT DOCUMENTS

| 3,240,078 | 3/1966 | Newell | 74/210 X |
| 3,344,062 | 9/1967 | Kosar | 210/DIG. 21 |
| 3,358,838 | 12/1967 | Kosar et al. | 210/242 X |
| 3,536,199 | 10/1970 | Cornelius | 210/242 |
| 3,608,728 | 9/1971 | Trimble | 210/242 |

OTHER PUBLICATIONS

IBM Technical Disclosure Bulletin, vol. 16, No. 1, p. 143, Jun. 1973, "Magnetic Print Belt Cleaner", Legg et al.

Primary Examiner—Robert H. Spitzer
Attorney, Agent, or Firm—Glenn B. Morse

[57] ABSTRACT

A disc is rotatably mounted in a position to be partially exposed to, or immersed in, a liquid. Slow rotation of the disc causes liquid adhering to the disc to move upward into a position where wipers remove most of the adhering film, and divert it into a drainage trough or collector. In the simplest form of the invention, the disc is of magnetic-responsive material, and the wipers are flexible strips having permanent magnetism.

1 Claim, 15 Drawing Figures

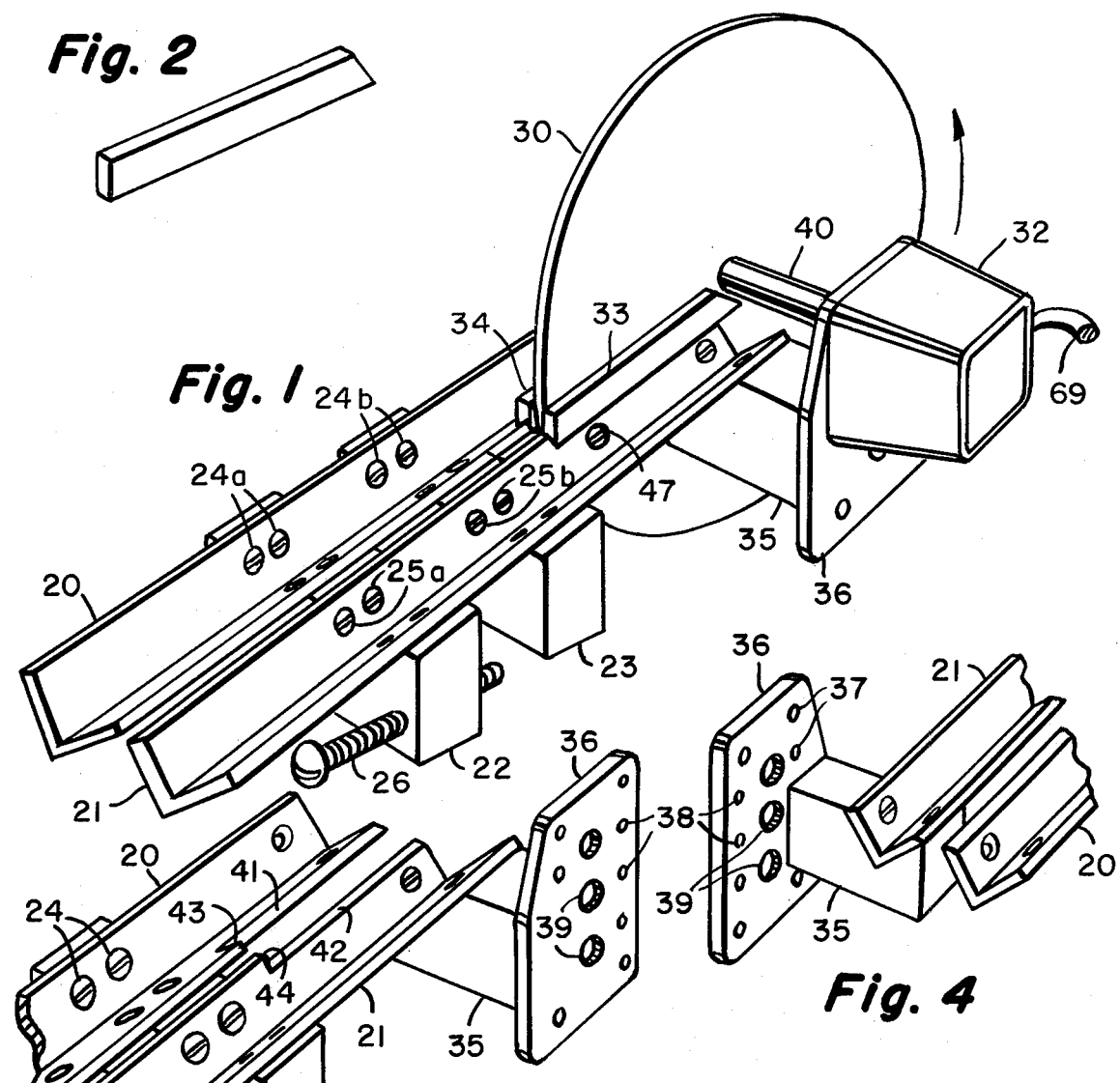

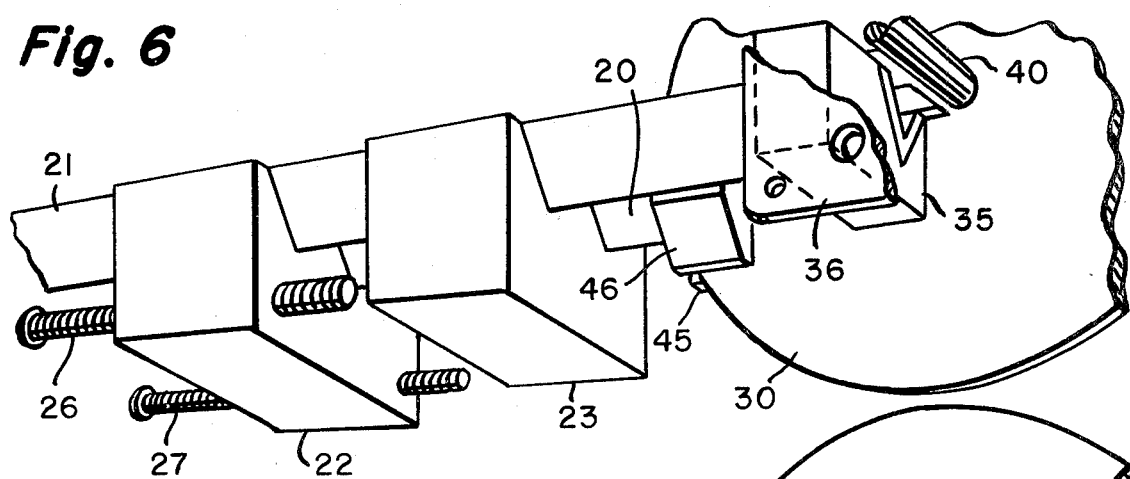
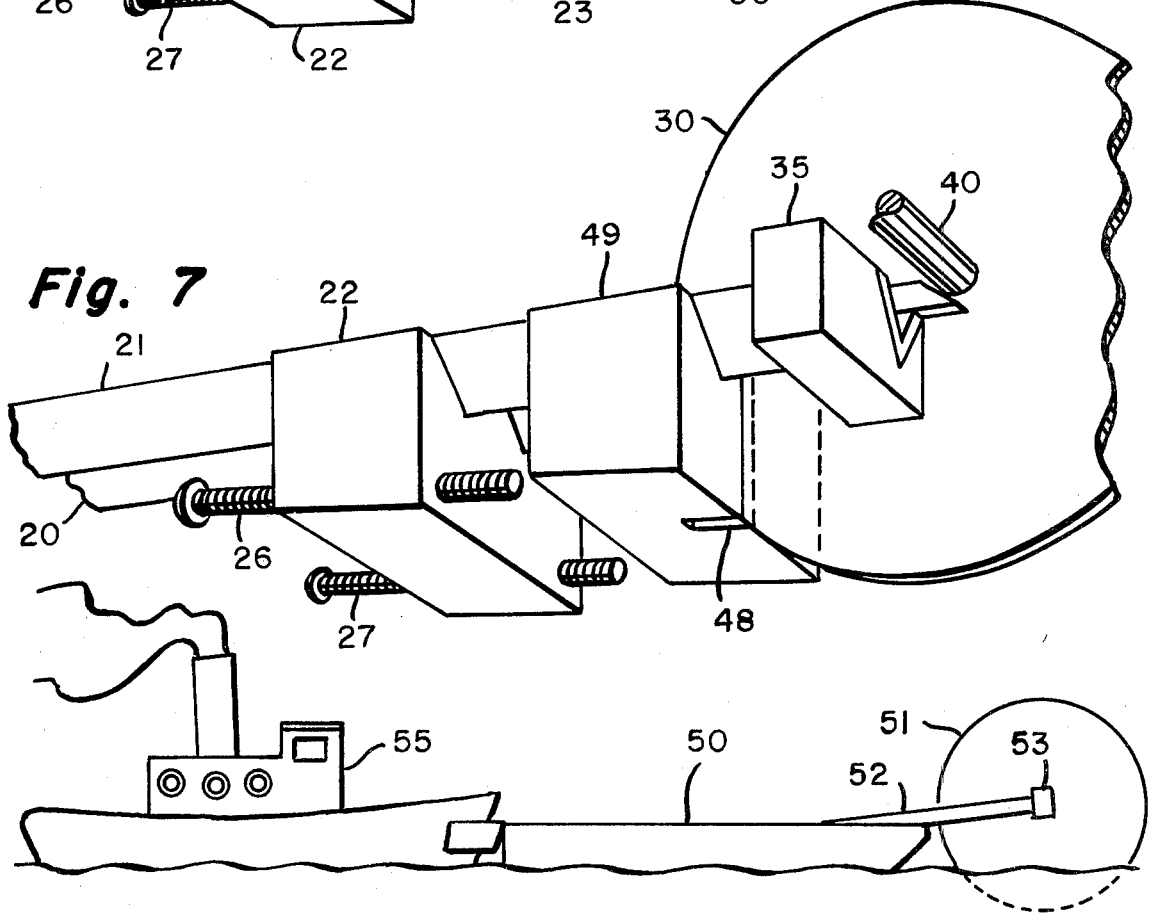
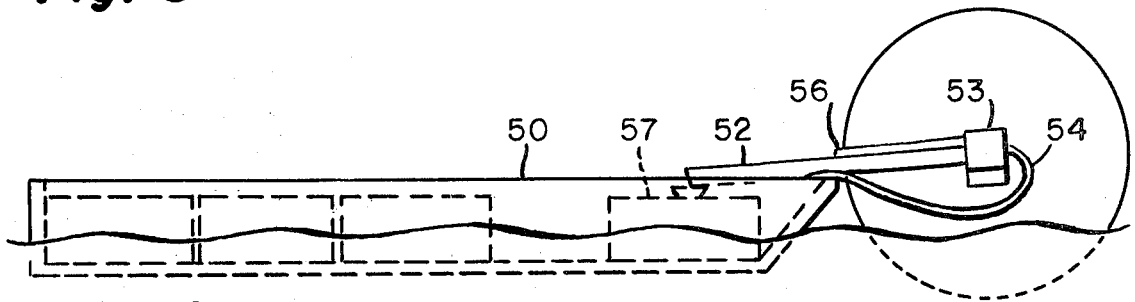

LIQUID-SEPARATING DEVICE

BACKGROUND OF THE INVENTION

Separation of one liquid from a heavier liquid is commonly done by skimming or by centrifuging. A common occurrence of the use of either of these procedures is the separation of an oil contaminant from a predominant mass of water. Many coolants used in conjunction with machining operations are water-based, and become contaminated with lubricating oil. Re-use of the coolant is made more effective by the removal of the lubricating oil. This removal has the additional effect of stopping the tank of liquid from functioning as a bacterial incubator. An oil film over the water effectively excludes oxygen from the water, which would otherwise attack the bacteria. The exposure of a water film to the air on the disc (after the oil has been substantially removed) by continuing the disc rotation further improves the oxygenating process. The removal of the oil film also eliminates a class of bacteria that thrives in the oil itself, tending to produce strong odors and rancidity. The use of a partially-immersed rotating disc for removing the oil is not broadly new. These machines have had various forms of spring-loaded wiping devices securely mounted on the machine frame, and deliver the oil to a collector.

SUMMARY OF THE INVENTION

The present invention provides a rotating-disc device of the simplest and most reliable construction known to applicant. The disc is made of magnetic-responsive material, and the wipers are preferably flexible strips of material having permanent magnetism. These features eliminate the problem of mounting the wipers and maintaining a resilient pressure uniformly across the swept area of the disc. The need for an accurate placement of a disc with respect to the wipers is also eliminated. Placement of the wipers is provided merely by abutments preventing the wipers from riding the disc, or from being moved radially with respect to it.

The invention also provides a method for decanting liquids and semi-liquids from a container, and further provides a series of rotating disc devices that are interrelated to transfer liquid progressively from one disc to the succeeding one. A method of removing oil spills from a body of water is also included, in which a vessel (preferably a barge) is equipped with a series of axially-spaced discs across the bow, and is moved through an oil-contaminated area.

DESCRIPTION OF THE DRAWINGS

FIG. 1 is a perspective view of one form of the invention, shown detached from a tank of liquid to which it is normally secured.

FIG. 2 is a perspective view of one of the wiper elements of the device shown in FIG. 1.

FIG. 3 is a fragmentary perspective view of the machine shown in FIG. 1, with the motor, disc, and wipers detached.

FIG. 4 is a perspective view of the structure shown in FIG. 3, from the opposite quarter.

FIG. 5 is a side elevation of the machine shown in FIG. 1, shown attached to the rim of a tank (appearing in section).

FIG. 6 is a fragmentary perspective view of the underside of the machine illustrated in FIG. 1, with the motor removed.

FIG. 7 is a view similar to FIG. 6, but showing a modified form of the invention.

FIG. 8 is a side elevation of a form of the invention used in removing oil spills from open water.

FIG. 9 is an enlarged view of the barge structure illustrated in FIG. 8, and illustrating the working relationship of the components.

DESCRIPTION OF THE PREFERRED EMBODIMENTS

Figure 10:
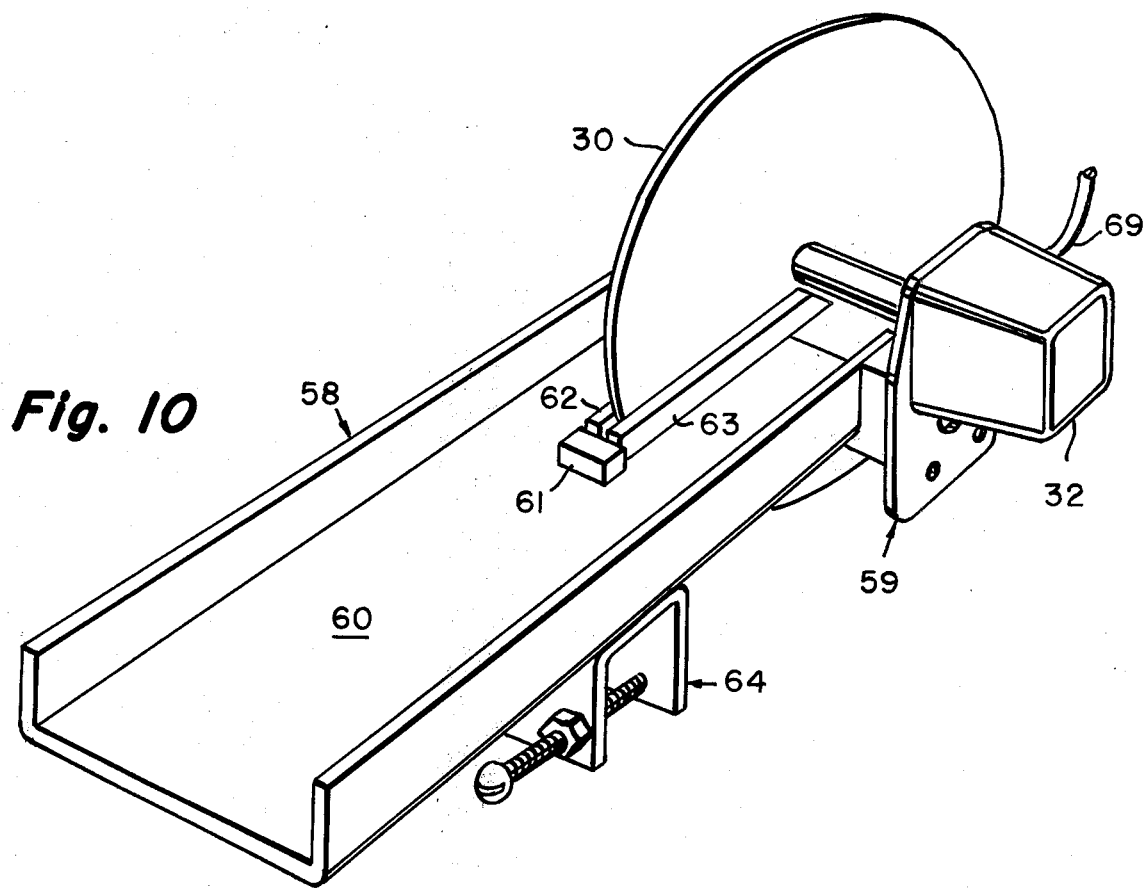
FIG. 10 is a perspective view of a modified form of the invention having a different structure from that appearing in FIG. 1.
Figure 11:
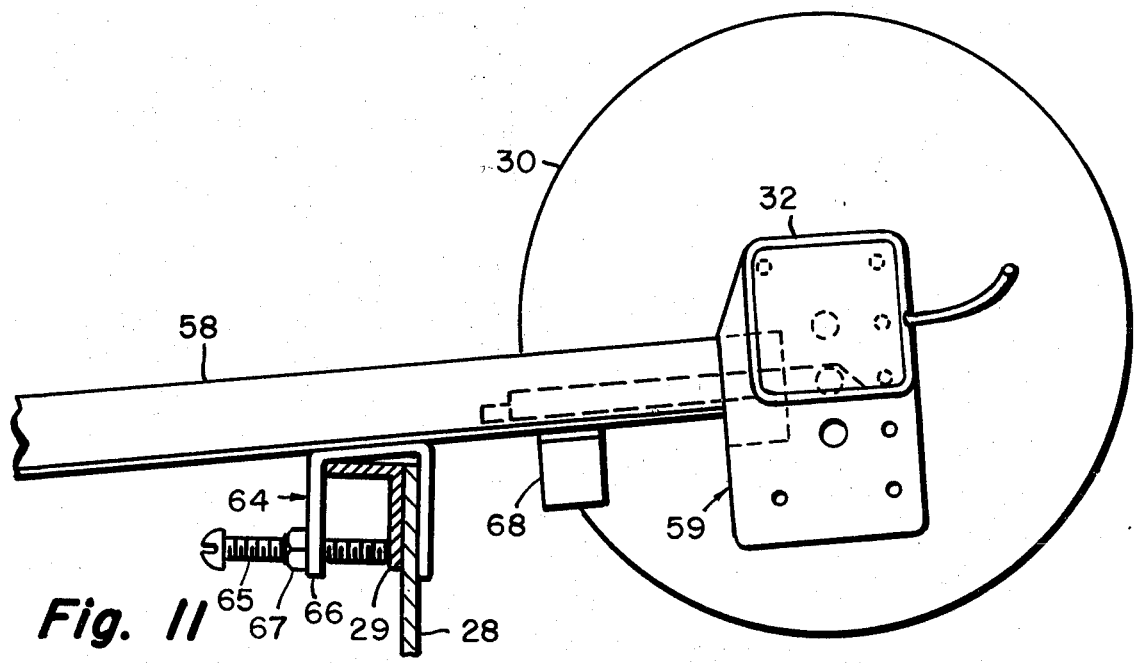
FIG. 11 is a sectional elevation of the device illustrated in FIG. 10, shown attached to a tank appearing in section.
Figure 12:
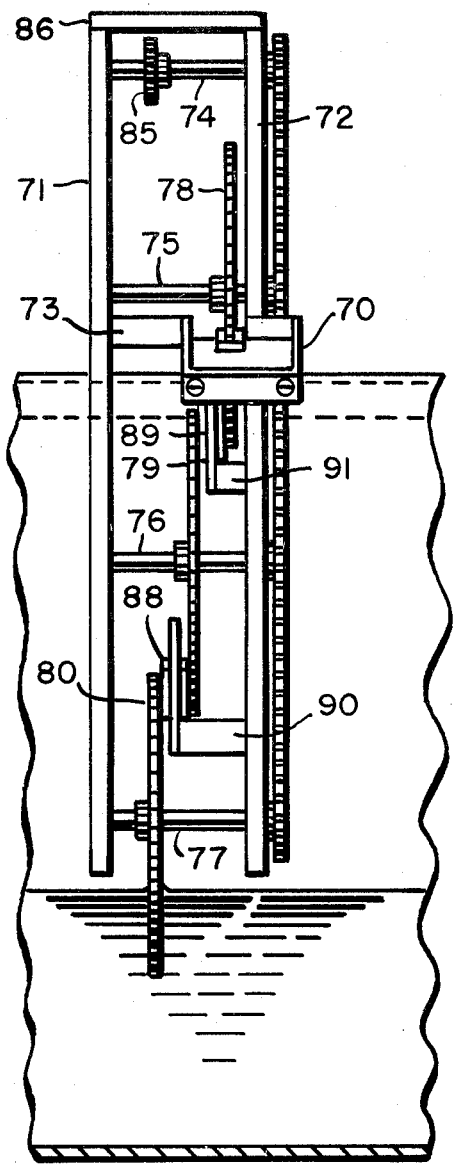
FIG. 12 is a view of a further modification of the invention incorporating a series of disc devices interrelated to transfer liquid from one to the other in sequence.

Referring to FIGS. 1 through 6, the two V-shaped trough elements 20 and 21 are secured together to the spaced blocks 22 and 23 by screws as shown at 24a–b and 25a–b. The blocks 22 and 23 form a clamp in conjunction with the clamping screws 26 and 27. Referring to FIG. 5, the rim structure of a tank 28 is received between the blocks 22 and 23, after which the clamping screws 26 and 27 can be tightened to secure the device in position. The rim structure will commonly include a stiffening angle as shown at 29, which accounts for the distance between the blocks 22 and 23. The device should be mounted in such a position that the disc 30 intersects the surface 31 of the liquid within the tank 28. The troughs 20 and 21 should be at a downward grade from the area over the inside of the tank of at least 5 degrees to the horizontal. The continuing rotation of the disc 30 by the motor 32 in the direction shown in FIG. 5 will cause liquid adhering to the disc to move around to the wipers 33 and 34 which remove the adhering film, and permit it to drain into the troughs 20 and 21.

At the inner end of the troughs, a block 35 is secured to the troughs in the same manner as the blocks 22 and 23. The block 35 supports a mounting plate 36 provided with the holes 37 and 38 for receiving fastenings securing the motor 32. The plate 36 may be either screwed or welded to the block 35. The central holes 39 in the mounting plate are for receiving the shaft 40 extending from the motor unit 32, and supporting the disc 30.

The wipers 33 and 34 are preferably strips of material similar to that commonly used to hold refrigerator doors closed against the pressure of the sealing gaskets. The material forming these strips is usually a flexible plastic material impregnated with metal particles having permanent magnetism. The disc 30 is of steel, or some magnetic-responsive material, with the result that the wipers hold themselves securely to the disc, and generate a uniform wiping action across the swept surface. Because of this tendency to secure themselves to the disc, the machine need only prevent the wipers from riding the disc, or from being displaced radially with respect to the axis of rotation. These functions are provided by the offsets 41 and 42 machined in the walls of the troughs 20 and 21, and by the shoulders 43 and 44 resulting from these offsets. The wipers rest against the offset surfaces 41 and 42, and the shoulders 43 and 44 prevent the wipers from moving in the direction of the troughs as a result of a placement of the axis of rotation of the shaft 40 slightly below the line of contact of the wipers with the disc 30. If this axis of rotation is slightly above the line of contact of the wipers 33, a slight tendency will exist for the wipers to move toward the axis of rotation. This is prevented by the engagement of the ends of the wipers themselves with the shaft 40, and by the fastening (not shown) securing the disc 30 to the shaft 40. The slight tendency for wipers to move radially is due to the frictional forces being disposed at a slight angle to the line of contact of the wipers, which results from displacement of the axis of rotation from this line. The provision of a plurality of holes 37-39 permits the mounting of the disc and its drive at varying vertical positions to accommodate the machine to tank structure having different normal liquid levels. In the arrangement shown in FIGS. 1-6, guide blocks as shown at 45 and 46 are secured to the underside of the troughs 20 and 21 to stabilize the edge of the disc disposed between them. These blocks are preferably secured to the trough sections by screws as shown at 47 in FIG. 1. With this arrangement, the disc exhibits less tendency to oscillate laterally, and thus generate an undesirable motion of the wipers with respect to the surfaces supporting them. Referring to FIG. 7, a modified form of the invention utilizes a slot 48 in the clamping block 49 to serve the function of the guide blocks 45 and 46. This arrangement has the advantage of simplicity. The troughs 20 and 21, and the opposing guideblock 22 and clamping screws 26 and 27 can be the same as in the structure shown in FIG. 1.

FIG. 8 illustrates schematically a system for removing oil spills from open water. A barge 50 is provided with a group of axially-spaced discs 51 rotatably mounted on troughs 52 at the bow of the barge 50. The assembly of discs 51 is rotated by a motor unit 53, which may be either electrical or hydraulic. Appropriate conduits or wires 54 extend to an appropriate source of energy (not shown) within the barge 50. The barge may be pushed by a vessel such as a tugboat 55 through an area contaminated by an oil spill, and the rotation of the disc assembly 51 and its associate wipers 56 will induce a pickup of the oil on the water surface, and drainage of it along the troughs 52 into containers 57 of convenient size carried within the barge 50.

FIG. 10 illustrates a modified form of the invention, which is related to FIG. 1. It differs from FIG. 1 in the configuration of the trough and clamp structure. In FIG. 10, the troughs 20 and 21 of FIG. 1 have been replaced by the channel-shaped member 58. The disc 30, the motor 32, and the motor-mounting structure generally indicated at 59 correspond to the structure shown in FIG. 1. The disc 30 is received within a slot in the floor 60 of the channel-shaped trough 58, and an abutment block 61 is secured to this floor, preferably by spot-welding. This abutment block serves to prevent movement of the wipers 62-63 away from the axis of rotation of the disc 30. This assembly is clamped to a tank structure 28 by the U-shaped member 64, which is preferably also secured to the floor 60 by spot-welding. The clamping screws 65 are in threaded engagement with the wall 66 of the member 64, and with the nut 67 preferably welded to it. Guide blocks as shown at 68 on the opposite sides of the disc 30 are optional in this arrangement, as the slot in the floor 60 of the trough 58 may perform this function. The presence of the blocks tends to localize the wear, and are replaceable. The motor units 32 in both the FIG. 1 and FIG. 10 modifications are preferably slow-speed and electrically operated, with energy being supplied through the wires 69. The rate of rotation of the disc 30 must be slow enough to avoid any substantial tendency for centrifugal force to throw off an accumulated film, or to produce a substantial amount of turbulence in the liquid such as might tend to isolate an oil film from the water adjacent the disc. In the operation of the machine, the oil exhibits a preference for the disc with respect to the water, and is picked up off the surface of the water and delivered to the wipers. With a disc of approximately 11 inches in diameter, a rotational speed of approximately 7 revolutions per minute has been found very effective to remove accumulations of oil from the surface of a tank containing both oil and a water-based solution.

Referring to FIGS. 12-15, an arrangement is shown for removing accumulations of oil from the surface of a liquid within a container which has considerable depth, and within which the level may be expected to vary over a range in excess of half the diameter of a disc. The container 69 is shown equipped with a trough and clamp assembly 70 similar to that appearing in FIG. 10. A pair of vertical beams 71 and 72 are secured to the end of the trough assembly 70 with the aid of the bridge bar 73. These parallel beams provide for the rotative support of the shafts 74-77. The shafts 75-77 are equipped with discs 78-80, and with sprockets 81-83, respectively. A sprocket 84 is provided on the shaft 74 and a drive sprocket 85 is provided for interconnection with a suitable motor unit (not shown). Such a unit may be mounted conveniently on the top member 86 interconnecting the beams 71 and 72. In view of the minimal torque required to rotate the discs, it will normally be unnecessary to provide idler sprockets to maintain the interengagement of the chain 87 with the sprockets 84 and 81-83.

Wipers as shown at 88 and 89 are interposed between the discs 80-79 and 79-78. These wipers are similar to those discussed in the previous modifications of the invention. They are located in position by the brackets 90 and 91, each of which includes a spacer block as shown at 92 in FIG. 14 and a locating plate 93. This plate has a slot 94 with one edge serrated as shown at 95. Wiper strips are received within the narrowest portion of the slot 94 as shown in FIG. 14, and rotation of the disc 80 in the direction shown will induce a deposit of oil along the upper edge of the wiper which will flow laterally across to the disc 79 via the openings provided by the serrated edge 95. The oil thus exposed to the disc 79 will be picked up and carried in similar fashion upward to be received by the disc 78, from which it will be deposited in the trough 70. The bracket assemblies are secured to the beam 72 by bolts as shown at 96 and 97 in FIG. 14. It is interesting to note that the arrangement shown in FIGS. 12 and 13 can begin its operation initially with the liquid near the top of the tank, and can proceed without interruption during periods in which, for one reason or another, the liquid within the tank 69 might fall to a level approaching the bottom.

Figure 13:
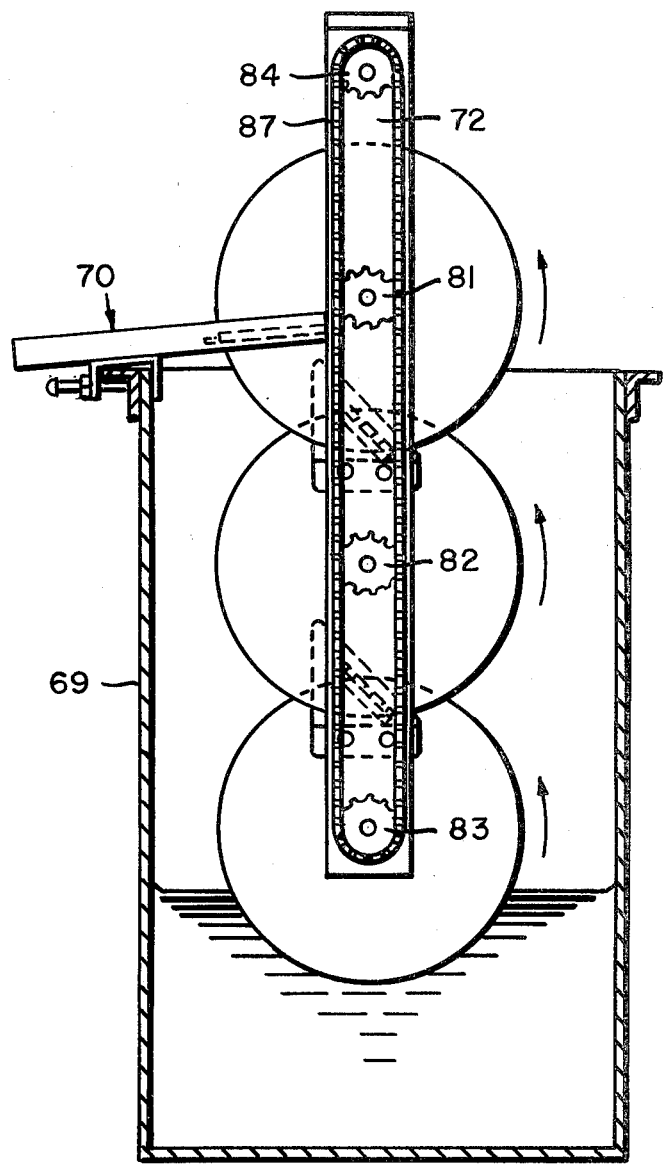
FIG. 13 is a sectional elevation of the machine shown in FIG. 12.
Figure 14:
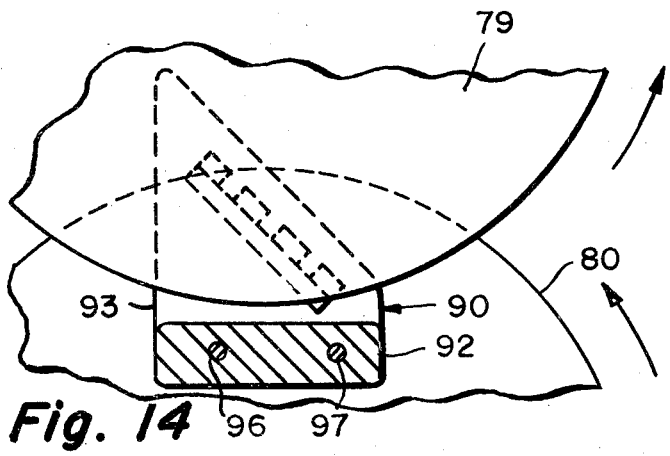
FIG. 14 is an enlarged view at the overlapping area between the successive discs of the device shown on FIGS. 12 and 13.
Figure 15:
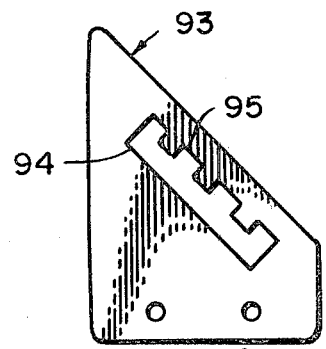
FIG. 15 is a plan view of the locating plate used to position the wiping strips of the device appearing in FIGS. 12 and 13.

It is also significant that the device shown in the FIG. 1, 10, or 13 can be used entirely as a pump, rather than as a device for separating one liquid from another. This is particularly valuable in cases where it becomes desirable to move small quantities of viscous liquids that otherwise require expensive hydraulic pumping equipment. Many situations arise where it becomes desirable to merely remove a liquid from one container and deposit it in another, as in metered mixing operations. The readiness with which the components of this mechanism can be cleaned make this pumping aspect a very desirable mode of operation. It is usable in most instance where the procedure commonly referred to as "decanting" is used. A device of this nature makes it unnecessary to progressively tilt a cumbersome container of liquid or semi-liquid, as an alternative to the use of expensive hydraulic pumps of standard design.

We claim:

1. A machine for elevating liquid material, said machine including frame means and plate means rotatably mounted on said frame means, and also including wiping means and collector means adapted to remove liquid from said plate means, and drive means adapted to rotate said plate means, wherein the improvement comprises:

at least two plates constituting said plate means mounted respectively on spaced axis of rotation and in overlapping relationship;

bracket means interposed between said plate, and mounted on said frame, said bracket means having a receptacle slot, and said wiping means is a flexible strip normally received in said slot and engaging said overlapping plates along the opposite edges of said strip, said bracket means constituting the sole supporting and retaining means for said strip, said drive means being operative to induce a common direction of rotation of said plates; and wherein said slot is normally inclined to the horizontal, and has a serrated edge on the side thereof facing the direction of rotation of one of said plates, and said one plate is mounted below the other of said plates.

* * * * *